United States Patent
Single

[15] 3,647,522
[45] Mar. 7, 1972

[54] METHOD OF RECLAIMING AND COATING PHOSPHOR
[72] Inventor: David Single, Chicago, Ill.
[73] Assignee: Motorola, Inc., Franklin Park, Ill.
[22] Filed: Apr. 29, 1970
[21] Appl. No.: 33,001

[52] U.S. Cl. .............. 117/100 B, 23/312 ME, 117/33.5 R, 117/33.5 C, 252/301.4 R, 252/301.6 S
[51] Int. Cl. ........................... H01j 1/63, C09k 1/04
[58] Field of Search ............... 117/100 A, 33.5 R, 33.5 C; 23/312 ME; 252/301.6 S, 301.4 R

[56] References Cited

UNITED STATES PATENTS

| | | | |
|---|---|---|---|
| 2,704,726 | 3/1955 | Markoski | 117/100 X |
| 3,348,924 | 10/1967 | Levine et al. | 23/312 |
| 3,474,040 | 10/1969 | Hedler et al. | 23/312 X |
| 3,523,904 | 8/1970 | Single | 117/33.5 X |

FOREIGN PATENTS OR APPLICATIONS

| | | | |
|---|---|---|---|
| 157,887 | 6/1951 | Australia | 117/33.5 |
| 695,335 | 8/1953 | Great Britain | 117/33.5 |

Primary Examiner—William D. Martin
Assistant Examiner—Mathew R. P. Perrone, Jr.
Attorney—Mueller and Aichele

[57] ABSTRACT

A method for reclaiming blue and green phosphor after it is used to form part or all of a coating on the faceplate of a color television picture tube so that such phosphor can be reused, and a method for applying a silicate coating to such phosphor particles with improved characteristics by suspending the phosphor particles in a solution of barium nitrate forming an ionic coating about the particles and then adding potassium silicate to the solution which molecularly and adhesively bonds to the surface of the phosphor particles to coat the same.

11 Claims, 4 Drawing Figures

INVENTOR.
DAVID SINGLE

BY Mueller & Aichele

ATTORNEYS.

METHOD OF RECLAIMING AND COATING PHOSPHOR

BACKGROUND OF THE INVENTION

This invention relates generally to a method of reclaiming phosphor after it is used to form color dots, or the like, on the faceplate or screen of a color television picture tube, and to a method of coating phosphor particles with silicate.

In forming phosphor color dots on the faceplate of a color television picture tube, a slurry of phosphor material is used to coat the faceplate with a uniform layer of the phosphor slurry and afterwards discrete areas are activated by ultraviolet light from a lighthouse, as is well-known in the art. In this slurry process, a phosphor screen is typically prepared in three separate stages. For example, the faceplate panel is first provided with a systematic array of blue phosphor dots or areas; second, the panel is provided with a similar array of green phosphor dots or areas, but displaced from the first array; and third, the panel is provided with a similar array of red phosphor dots or areas, and also displaced from the blue and green dots. The order of forming the phosphor dots may be changed as desired. The resulting combination of red, blue and green arrays of phosphor dots form color triads. Preferably, the blue phosphor consists of zinc sulfide, the green phosphor consists of zinc cadmium sulfide, and the red phosphor consists of yttrium orthovanadate.

In each stage of the operation of forming these phosphor dots, a slurry, of the powdered phosphor mixed with polyvinyl alcohol and other materials, is applied to the faceplate in a thin, uniform layer by placing a quantity of the phosphor slurry substantially centrally of the faceplate and spinning or rotating the same while tilting it through an angle sufficient to cause a complete coating to form on the faceplate. The excess slurry is poured off and the coating on the faceplate is dried. The shadow mask which is to be used with the particular color television picture tube being formed is then fastened in place on the faceplate and the unit is subjected to ultraviolet light in a lighthouse as is well-known in the art. The ultraviolet light then activates or sets only desired discrete dots of phosphor, and the remaining unset or unactivated phosphor is washed away from the faceplate. The faceplate is then subjected to a second coating process of another phosphor color which completely covers the faceplate including the previously activated phosphor dots. This subsequent coating of phosphor material is also by the slurry and spin process mentioned hereinabove. The second coating is also dried and treated using ultraviolet light from a lighthouse in the same manner so as to cause discrete areas thereof to become activated and set on the faceplate. The undesired surplus of phosphor material, i.e., that which does not form the phosphor dots, is then washed away. The final operation of applying the third phosphor dot is carried out in substantially the same manner as mentioned hereinabove.

By forming phosphor dots as described hereinabove, several problems are encountered as a result of the phosphor material used. For example, the first plurality of phosphor dots formed on the faceplate may have sporadic ones of them contaminated with various amounts of the phosphor material subsequently coated over the first formed dots. This detracts from the color purity of the dots in that instead of blues, greens and reds being formed, various other colors are created at the discrete dot. This problem occurs because of, among other things, the poor quality of phosphor surface or surface coating over the phosphor material. The coating has a function of preventing subsequent contamination of fixed phosphor dots as well as for providing a more workable finished phosphor coating on the faceplate. Coating herein referred to is any suitable material such as the preferred silicate coating.

Additionally, breezeway contamination may also occur using phosphor materials having inferior surface coatings thereon. Such breezeway contamination occurs when undesired phosphor material inadvertently adheres to the faceplate at areas between the desired formation of phosphor dots. This breezeway contamination also causes color mixing of undesired colors.

The problem of color dot contamination and breezeway contamination with foreign material, such as the phosphor being used, is further perpetuated when using phosphor materials reclaimed in a conventional manner. Such reclamation of the phosphor material merely washes the phosphor with water so as to remove the polyvinyl alcohol (PVA) and ammonium dichromate which were used to form the phosphor slurry for coating the faceplate. By washing the phosphor particles to remove the PV alcohol and ammonium dichromate, a certain amount of coating is also removed from the phosphor. The reduction of coating increases the undesired results of the dot contamination and breezeway contamination mentioned hereinabove. Additionally, the silicate coating heretofore formed on particles of phosphor has been by adhesion of the silicate to the phosphor particles so that reclaiming only a few times would ultimately wash away and remove the silicate coating.

SUMMARY OF THE INVENTION

Accordingly, it is an object of this invention to provide a method for reclaiming phosphors used to form coatings on the faceplate of color television picture tubes, which method is more efficient and reliable than methods heretofore known.

Another object of this invention is to provide a method of coating phosphor particles with silicate so that such silicate is molecularly as well as adhesively bound to the phosphor particles so as to withstand a greater number of reclaiming operations before a recoating is necessary.

Another object of this invention is to provide phosphors which more readily wash off of unactivated areas on a faceplate of a color television picture tube to prevent dot contamination and breezeway contamination during the formation of color triads on such color television picture tube.

One feature of the present invention is the method of descumming large quantities of washing solution during the reclaiming and washing operations of this process; and another feature is the use of a surface flow of water into a trough to remove light surface scum from the washing solution to decrease the amount of time and expense necessary for proper cleaning of the reclaimed phosphor particles.

Briefly, the present invention contemplates the use of a vacuum device, similar to a vacuum cleaner, to vacuum foam like scum from the surface of a washing solution within a washing tank after a given period of time of subjecting the phosphor within the tank to agitation and then settling the phosphor. The light scummy residue is formed by the removal of the PV alcohol which is washed away and is vacuumed from the top of the wash tank to prevent the need of completely draining the tank. After the vacuuming operation, water is then added to the tank at a rate of, for example, less than 10 gallons per minute, and preferably, in the order of 3 gallons per minute, to cause a surface flow of water into a trough, which is formed within the washing tank, and such surface flow of water also removes any light scum which is floating at the top of the washing solution.

If it is desired to recoat the phosphor with silicate material, it can be done during this reclamation process. This is accomplished by subjecting the phosphor particles to a relatively dilute solution of deionized water and adding a quantity of barium nitrate to the water ultimately to be dissolved therein, this taking in the order of 30 minutes or so. After the barium nitrate is dissolved, it forms an ionic solution which completely surrounds each of the phosphor particles within the tank. Subsequently, a quantity of potassium silicate is added to the solution and, because of the ionic condition of the barium nitrate, is molecularly attracted to each phosphor particle at the surface thereof. The barium nitrate ions allow the potassium silicate to form molecular bonds at the outer surface of the phosphor. By coating the phosphor in this manner, a molecular as well as an adhesive bond is formed of the silicate to the phosphor, and as such is more firmly held to the phosphor during subsequent washing operations. That is, the potassium silicate-coated phosphor can be washed many more times than can otherwise be the case using conventional coated phosphor particles. Furthermore, the potassium silicate is an improved silicate coating in that washing the phosphor from the faceplate after activating discrete areas thereof removes all of the unactivated phosphor, including that which would otherwise form dot contamination and breezeway contamination. Furthermore, the color dots so formed by using the improved potassium silicate coated phosphor adheres more firmly to the faceplate upon activation thereof by ultraviolet light to eliminate lost dots, i.e., dots which are supposed to be set, but which fall off during the manufacturing process, greatly to improve the quality of the color television picture tube being produced.

DESCRIPTION OF THE PREFERRED EMBODIMENT

Figure 1:
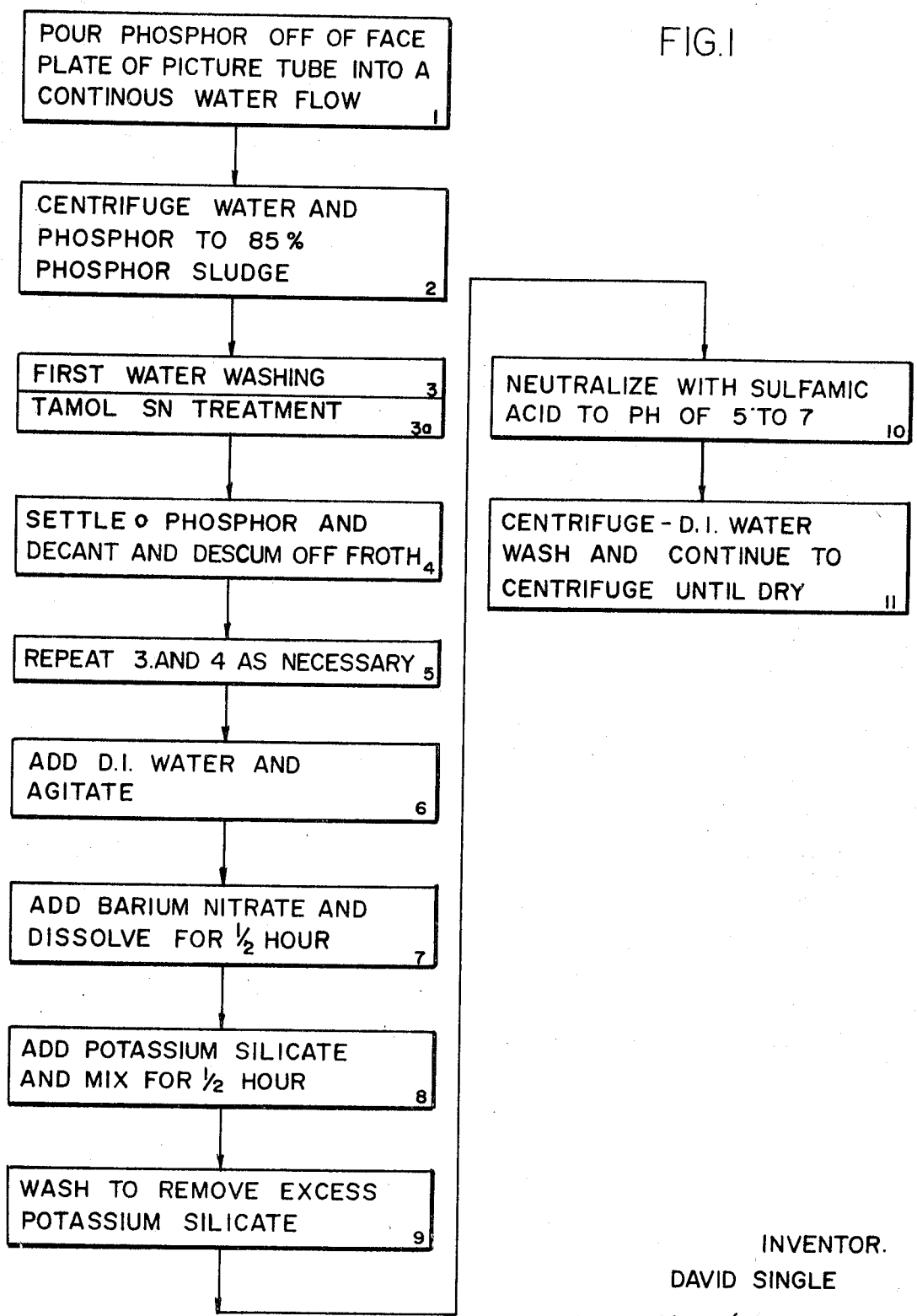
FIG. 1 illustrates a full diagram of the process of reclaiming and coating phosphor in accordance with this invention.

Referring now to FIG. 1, the process illustrated herein has particular utility for reclaiming green and blue phosphor used to form color television picture tubes, though it will be understood that modifications of this process can be effected to reclaim other phosphors such as red phosphor or the like. Because of the similarities of blue and green phosphor, either one can be reclaimed by this process substantially without change. That is, the blue phosphor consists of zinc sulfide activated with silver, while the green phosphor consists of zinc sulfide and cadmium sulfide activated with silver and each of these sulfides can be reclaimed and coated in accordance with this invention.

The first step in reclaiming the phosphor is to pour excess phosphor slurry from the faceplate of a color television picture tube, not shown, into a continuous water stream which transports the phosphor so deposited to a continuous centrifuge which is illustrated by the second step of the process of FIG. 1, whereupon the water is separated from the phosphor leaving a phosphor sludge 85 percent dry.

Figure 2:
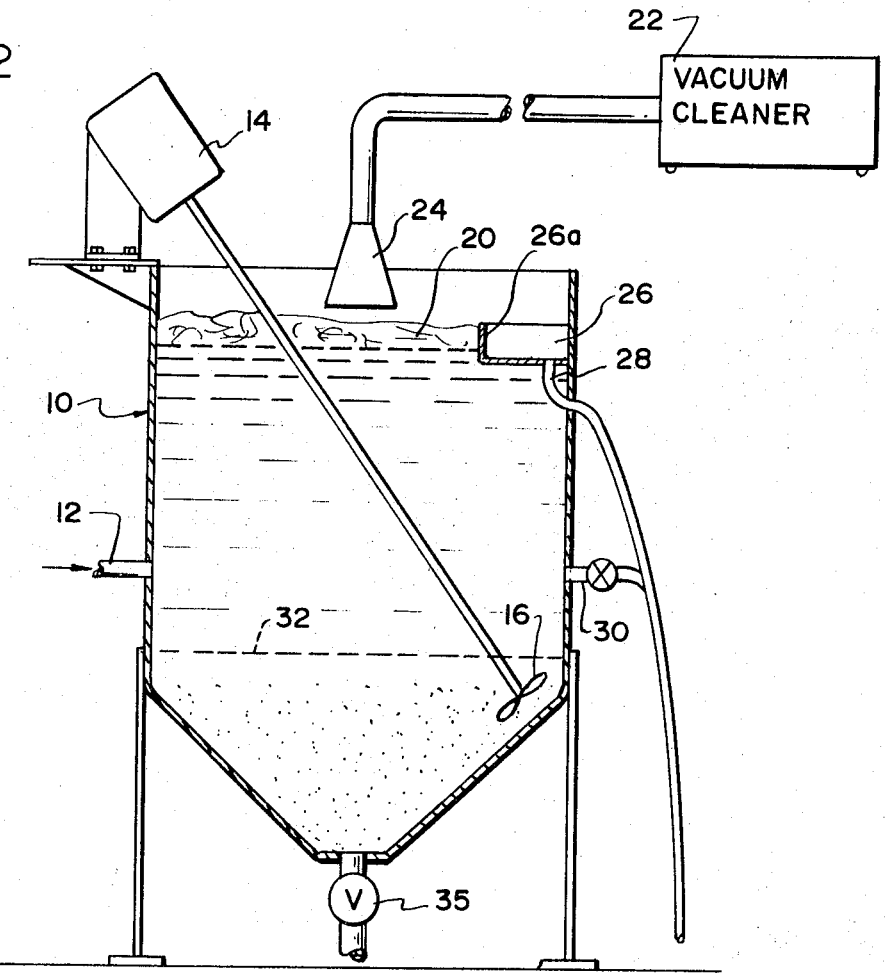
FIG. 2 is a somewhat diagrammatic representation of a washing or holding tank and other apparatus used in the process of FIG. 1.

The third step of the process consists of taking this phosphor sludge collected in the centrifuge and putting it into a washing or holding tank 10, of FIG. 2, for a washing treatment. By way of example, a 115-gallon stainless steel washing tank receives approximately 300 to 325 lbs. of phosphor sludge, either green or blue. Deionized water is added to the tank 10 through a lower inlet 12 substantially to dilute or thin down the sludge, this being approximately 40 gallons or so of deionized water. The deionized water and phosphor are then agitated by a mixer 14, of FIG. 2, which has its blade 16 extended into the water. This mixing action takes place for approximately 15 minutes, more or less, and thereafter approximately one pound or 600 milliliters of Tamol SN is added to the 40 gallons of deionized water the phosphor, and the moderate agitation continues for approximately 3 hours, more or less. The Tamol SN consists primarily of a sulphonic acid derivative represented $RSO_2OH$, where R is alkyl or aryl. The sulphonic acid derivative acts as a deadherent to break up conglomerations formed in the slurry, this generally being constituents of polyvinyl alcohol (PVA) and ammonium dichromate, which are used to form the phosphor slurry for application to the faceplate of the color television picture tube.

Figure 3:
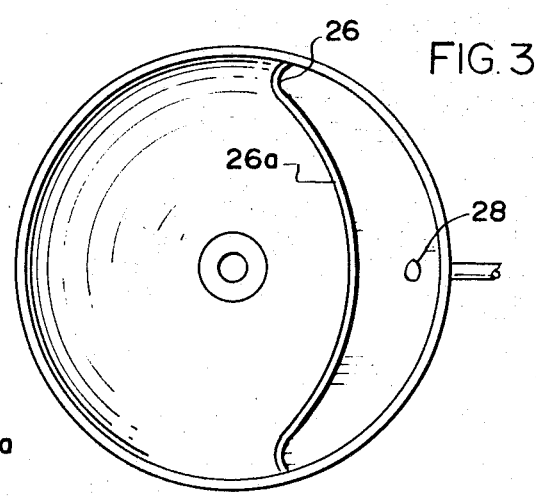
FIG. 3 is a top view of the holding tank of FIG. 2 showing a trough for receiving a surface flow of water during a descumming operation.

After 3 hours of agitation, deionized water is added to the tank 10 through the inlet 12 to fill the tank to the 90 gallon level or thereabouts. The mixer is turned off and the blade 16 is raised within the tank at least sufficient to be above the level of a phosphor settling at the bottom of the tank, this level being illustrated by reference numeral 32. The settling process is about 7 hours, during which the time large amounts of froth and scum 20 form at the surface of the solution within the tank 10. A vacuuming apparatus 22 connected to a vacuum nozzle 24 is used to vacuum off and descum the surface of the washing solution within tank 10. This vacuuming operation removes approximately 90 percent of the surface froth or scum thus making the washing process more efficient. The remaining scum at the surface of the washing solution is removed by adding deionized water to the tank 10 through the inlet 12 at a flow rate, for example of less than 10 gallons per minute, and preferably in the order of 1 to 3 gallons per minute to raise the water level within tank 10 up to a trough 26, as best seen in FIGS. 2 and 3. The peripheral surface of trough 26 is relatively large so as to have a relatively slow water flow rate across the leading edge 26a of the trough during this descumming operation. The slow water flow rate removes surface scum which then passes through an outlet 28 connected to suitable drain means. The water flow rate of 1 to 3 gallons per minute continues for approximately one-half hour. The flow of deionized water is then terminated and the water within the tank is drained through the outlet 30 to lower the level approximately to the level of the settled phosphor indicated by the broken line 32.

The washing process described hereinabove can be repeated as many times as is necessary to effect the desired cleanliness. This being repeated two or three times for example. The phosphor material reclaimed in this manner and washed, if still sufficiently coated with silicate, can be reused to form phosphor coatings on the faceplates of color television picture tubes to form the color dots thereon. However, should it be necessary to coat or recoat the phosphor particles with silicate, the phosphor is then coated in accordance with another aspect of this invention.

The water level within the washing tank 10 is raised to the 40 gallon level with deionized water added through inlet 12 and the mixer 14 is arranged so that the blade 16 again moderately agitates the mix within the tank 10, this occurring for approximately 2 hours. While continuing the agitation, approximately 900 grams of reagent grade barium nitrate is added to the solution in the tank 10 and allowed to dissolve for approximately one-half hour, moderate agitation continuing. While continuing the agitation, approximately 8,800 milliliters of a 30 percent solution of electronic grade potassium silicate is added to the solution in the holding tank and mixed for approximately one-half hour. The potassium silicate forms the silicate coating over the phosphor particles but, in this instance, the silicate coating is molecularly, as well as adhesively, bound to the surface of the phosphor particles to produce much better results when the phosphor is used to form coatings on the faceplate of the color television picture tube. That is, phosphor particles coated with potassium silicate substantially eliminate the dot-contamination problems as well as breezeway contamination problems which occur in the manufacture of color television picture tubes.

Figure 4:
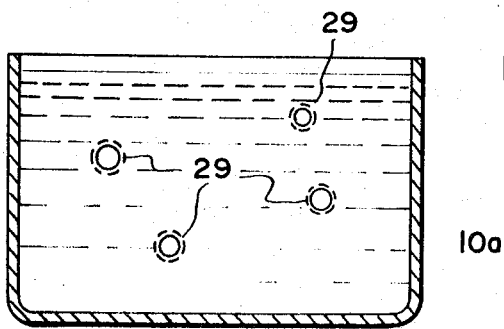
FIG. 4 is a diagrammatic representation showing several greatly enlarged phosphor particles with ionic layers surrounding them to which silicate coatings are attached.

The barium nitrate solution within the tank 10 forms ionic conditions at the surface of each phosphor particle, such conditions being indicated by the broken lines 29 about the phosphor particles 31 within the tank 10a shown in FIG. 4. When the potassium silicate is added to he solution, it molecularly combines with the barium nitrate ions at the surface of the phosphor particles to form the improved silicate coating thereon.

To remove the excess potassium silicate from the solution within the washing tank 10, the washing process described hereinabove can be repeated once or twice, for example. Only enough barium nitrate is used in the solution to effect coating of the amount of phosphor within the tank 10 and therefore, little or no barium nitrate remains to be removed after the coating process.

If the reclaiming and coating process takes place in several washing tanks similar to that of the washing tank 10, the processed material can be removed through an outlet valve 35 at the bottom of the tank and then put into a larger tank for subsequent processing in larger quantities. For example, three or more tanks of the same kind of phosphor can be combined in a 250-gallon tank and deionized water added thereto.

In any event, the slurry of phosphor particles after being coated with potassium silicate is neutralized with sulfamic acid to a pH of 5 to 7. This is accomplished, for example, by adding 900 lbs. of phosphor from three batches or so diluted into the 250 gallons of deionized water and then adding approximately 1,100 grams of sulfamic acid thereto to attain the desired pH within the range of 5 to 7, preferably a pH of 6.

The phosphor material process in accordance with this invention is then put into a centrifuge which has a stainless steel three-way twi-clover bypass valve installed at the drain side of the centrifuge for the purpose of reclaiming the effluent liquor which passes through the centrifuge during the initial operation thereof. That is, this prevents the loss of phosphor particles that escape through a cloth mesh barrier onto which ultimately is formed a cake of the phosphor particles. The effluent liquor is returned or pumped back to the original holding tank and recirculated for a time necessary to clear up or remove all phosphor from effluent depositing it in the centrifuge. The centrifuge is operated initially at approximately 800 r.p.m. and the cloth is approximately 250-mesh, and the centrifuge continues until a sufficient cake is formed on the fine mesh cloth filter. After a cake has been collected on the mesh filter, deionized water is sprayed into the centrifuge against the cake to rinse the phosphor particles; this rinsing occurring for approximately one hour. The spin speed of the centrifuge is increased to approximately 1,600 r.p.m. to remove the water and approximately 40 p.s.i. of dry air is pumped into the centrifuge until the cake of phosphor material is damp dry. The phosphor material is then removed from the centrifuge and may or may not be further dried for further use in the process of forming phosphor dots on color television picture tubes.

Accordingly, this invention provides a novel process for reclaiming phosphor as well as providing an improved method of applying silicate coatings to phosphor particles and such phosphor particles coated in this manner have improved characteristics. It will be understood that variations and modifications of this invention may be effected without departing from the spirit and scope of the novel concepts disclosed and claimed herein.

I claim:

1. A method of reclaiming phosphor after it is used to form part or all of a coating on the faceplate of a color television picture tube, including the steps of:
   collecting the phosphor from the faceplates so formed into a washing tank;
   washing the phosphor with a sulphonic acid derivative until a scum forms on top thereof;
   vacuuming scum from the top of said washing tank; and
   neutralizing the washed phosphor.

2. A method of reclaiming phosphor according to claim 1 wherein, following the vacuuming of the scum from the top of the washing tank, including the step of:
   adding water to said washing tank at a rate less than 10 gallons per minute to cause surface flow of the water into a trough to descum the surface of the washing water within the washing tank.

3. The method of reclaiming phosphor according to claim 1 wherein after vacuuming;
   adding barium nitrate to the washing tank to form ionic coating solution around the phosphor particles therein; and
   adding silicate to the washing tank which forms a molecular bond with the ionic coating solution at the surface of the phosphor particles to coat the particles with silicate.

4. The method of reclaiming phosphor according to claim 3 wherein said silicate is potassium silicate.

5. The method of reclaiming phosphor according to claim 1 wherein said neutralizing is accomplished by adding a solution containing sulfamic acid to the washing water to cause a pH within a range of 5 to 7.

6. A method of reclaiming and coating phosphor after it is used to form part or all of a coating on a faceplate of a color television picture tube, including the steps of:
   collecting the phosphor from the faceplates of the picture tubes into a continuous water flow;
   supplying the phosphor slurry to a centrifuge to form a phosphor sludge;
   placing the phosphor sludge in a washing tank;
   washing the phosphor with a solution of sulphonic acid derivative;
   vacuuming scum from the surface of the washing water within the washing tank;
   adding water to the washing tank at a rate of less than 10 gallons per minute to cause a surface flow of the washing water into a trough to further descum the surface of the solution within the washing tank;
   subjecting the phosphor within the washing tank to a quantity of deionized water;
   adding barium nitrate to the solution of phosphor and deionized water;
   adding potassium silicate to the phosphor and deionized water to form a potassium silicate coating over the phosphor particles;
   washing the potassium silicate-coated phosphor to remove excess barium nitrate and potassium silicate from the solution; and
   neutralizing the solution of potassium-coated phosphor.

7. The method of reclaiming and coating phosphor according to claim 6 including the step of mixing the potassium silicate with the barium nitrate for a period of time in the order of 10 to 60 minutes.

8. The method of reclaiming phosphor according to claim 6 wherein said neutralizing is accomplished by adding a solution containing sulfamic acid to the washing water to cause a pH with a range of 5 to 7.

9. A method of coating phosphor particles with potassium silicate, comprising the steps of:
   forming a slurry of phosphor to be coated in deionized water;
   adding barium nitrate to said slurry to form an ionic solution around the phosphor particles; and
   after the ionic solution is formed around the phosphor particles adding potassium silicate to the slurry to form an ionic bond of potassium silicate with the barium nitrate at the surface of the phosphor particles molecularly and adhesively to coat the phosphor particles with said potassium silicate.

10. The method of coating phosphor particles according to claim 9 including the step of washing the coated phosphor particles to remove excess potassium silicate from the slurry, and neutralizing the slurry of coated phosphor particles with sulfamic acid to a pH of 5 to 10.

11. The method of coating phosphor particles according to claim 9 wherein said slurry of phosphor particles is subjected to a washing before adding the barium nitrate thereto, said washing including a solution of sulphonic acid derivative.

* * * * *